United States Patent [19]

Riegler et al.

[11] 4,132,452
[45] Jan. 2, 1979

[54] SLIDE-ARTICULATION BEARING, IN PARTICULAR FOR TILTABLE CONVERTERS

[75] Inventors: Ernst Riegler, Enns; Manfred Schmidt, Linz, both of Austria

[73] Assignee: Vereinigte Österreichische Eisen-und Stahlwerke - Alpine Montan Aktiengesellschaft, Linz, Austria

[21] Appl. No.: 859,443

[22] Filed: Dec. 12, 1977

[30] Foreign Application Priority Data

Dec. 30, 1976 [AT] Austria ................................. 9810/76

[51] Int. Cl.² .................... F16C 17/00; F16C 21/00
[52] U.S. Cl. .................................... 308/3 R; 266/91; 308/1 A; 308/72
[58] Field of Search ............... 308/3 R, 3.5, 1 A, 5 R, 308/36.1, 72, 73, 194, 35, 237, 239, 74, 75, 240, 22, DIG. 8, 238; 266/91, 245, 246

[56] References Cited

U.S. PATENT DOCUMENTS

| 3,523,714 | 8/1970 | Pühringer | 308/35 X |
| 3,819,241 | 6/1974 | Memmel | 308/238 X |
| 4,072,372 | 2/1978 | Korrenn et al. | 308/DIG. 8 X |

Primary Examiner—Barry L. Kelmachter
Assistant Examiner—Douglas C. Butler
Attorney, Agent, or Firm—Brumbaugh, Graves, Donohue & Raymond

[57] ABSTRACT

A slide-articulation bearing for supporting a shaft, in particular for tiltable converters, has a circular-cylindrical sliding face forming a unit with the shaft, sliding elements held by a cage contacting the sliding face, and an outer race with a spherical inner face for accommodating wobbling movements of the shaft. The cage is provided with radially directed recesses that are open towards the cage inner and outer sides, the sliding elements being inserted therein so as to project out of the recesses. The sliding elements have outwardly projecting ends provided with spherical outer faces that contact and cooperate with the spherical inner face of the outer race.

7 Claims, 2 Drawing Figures

SLIDE-ARTICULATION BEARING, IN PARTICULAR FOR TILTABLE CONVERTERS

BACKGROUND OF THE INVENTION

The invention relates to slide-articulation bearings, in particular for tiltable converters, which bearings have a circular-cylindrical sliding face forming a unit with an axle or shaft to be supported sliding elements, (preferably produced of synthetic material and held by a cage) contacting the sliding face, and an outer race with a spherical inner face for accommodating the wobbling movements of the axle or shaft.

Such a slide-articulation bearing functioning as an expansion bearing is known from German Utility Model No. 7,502,998. The bearing race holding the slide elements — and thus taking over the function of a cage — has on its outer side a spherical slide face cooperating with the spherical inner face of the outer race, so that rotations and axial displacements of the axle or shaft are accommodated by slide elements. However, wobbling movements of the axle or shaft have to be accommodated by sliding the bearing race directly on the outer race, whereby friction conditions prevail for the wobbling movements, which conditions can be controlled only with difficulty. A further disadvantage of the known bearing is that the making of the spherical outer face of the bearing race holding the slide elements requires complex production procedures. Furthermore, a relatively great construction height is necessary when using three bearing races movable relative to one another and accommodating the load. The known bearing construction thus is heavy and expensive.

From Austrian Pat. No. 325,081 a slide-articulation bearing is known whose outer race is designed as a slide bushing, so that the articulation bearing is displaceable within the bearing housing. When axially displacing the axle or shaft the total bearing inset must thus be displaced within the bearing housing. Also with this bearing, unstable friction conditions can be created by the immediate contact between the metallic outer race and the bearing housing.

SUMMARY OF THE INVENTION

The invention aims at avoiding these disadvantages and difficulties and has as its object to provide a slide-articulation bearing of the above-defined kind to be used as an expansion bearing and which offers equal and constant friction conditions to the rotational movements of the axle or shaft, its axial displacement and its wobbling movements. Furthermore, the construction height and weight of the bearing are to be reduced.

According to the invention these objects are achieved, in a bearing of the above-defined kind, by providing the cage with recesses radially extending and open towards its inner and outer sides, in which recesses projecting sliding elements are placed. The sliding elements, on their outwardly extending ends having a spherical outer face for contacting the spheric inner face of the outer race and cooperating with this inner face.

According to a preferred embodiment the radial recesses penetrate the cage, and one-piece sliding elements are inserted in these recesses. With this arrangement, the production of the cage is especially simple; no depth tolerances have to be observed for the recesses.

It is suitable for simplifying the production of the axle or shaft, if the sliding elements, with their inwardly extending ends, lie on a slide bushing surrounding the axle or shaft.

It is advantageous, if the cage is loosely inserted between the circular-cylindrical sliding face and the outer race, so that it can follow a rotation of the sliding face. With this arrangement, all sliding elements are worn uniformly, due to a relative rotation between the cage and the circular-cylindrical sliding face, and between the cage and the outer race, respectively, thus leading to an increased service life for the bearing.

If the cage were firmly fixed, only those sliding elements arranged in the region of load would be worn. In order to make use of the slide elements arranged outside the region of load, the bearing would have to be disassembled and the cage would have to be turned to locate the new sliding elements in the region of load.

In order to use the bearing according to the invention also for weight determinations, as is sometimes desired with converter plants, at least those sliding elements inserted in the recesses in the load region of the bearing are comprised of two parts superimposed on each other in the radial direction, with a force measuring device inserted between those two parts. The cage is secured against rotation by a safety bolt inserted in the outer race and projecting into a recess of one of the sliding elements or of the cage.

BRIEF DESCRIPTION OF THE DRAWINGS

The invention will now be explained in more detail by way of two embodiments and with reference to the accompanying drawings, wherein.

DESCRIPTION OF EXEMPLARY EMBODIMENTS

Figure 1:
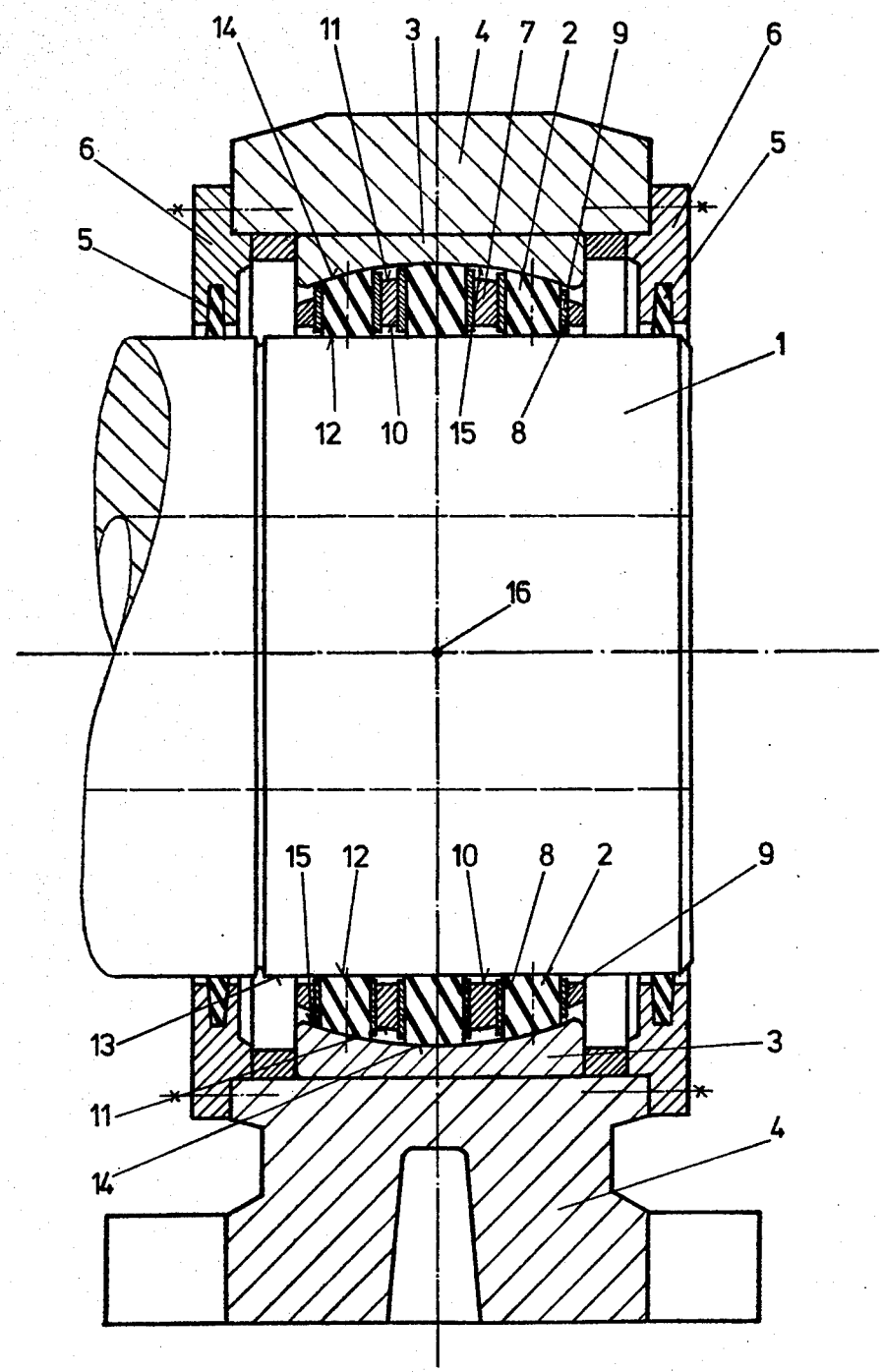
FIG. 1 and FIG. 2 each show an axial, schematically illustrated section of separate embodiments of bearings according to the invention.

In FIG. 1 a shaft 1 is arranged via sliding elements 2, which elements are preferably produced of synthetic material, in a divided bearing outer race 3 rigidly inserted in a divided bearing housing 4. Side lids 6 provided with seals 5 serve as protection for the bearing. The slide elements 2 are held in their position relative to one another by a cage 7. For this purpose, the cage 7 has recesses 8 penetrating it in the radial direction and the sliding elements 2, which are enclosed by sleeves 9, are held in the recesses but are radially displaceable. The sliding elements 2 slightly project over the cage inner side 10 and the cage outer side 11. The ends 12 of the sliding elements extending radially inwards, rest on a circular-cylindrical, hardened and ground sliding face 13, which, according to FIG. 1, is formed by the shaft surface. The ends 14 of the sliding elements 2 that are radially directed outwards, each have a spherical outer face cooperating with a spherical inner face 15 of the outer race 3 produced of hardened antifriciton-bearing steel. The center of spherical inner face 15 is identical with the bearing center 16. The cage 7, which is not affected by the bearing load and which, due to play between the sliding face 13 and the outer race 3, can be produced with great tolerances, is loosely inserted between the shaft 1 and the outer race 3, i.e. it can follow the rotation of the shaft 1. During normal operation of the bearing, the inner ends 12 of the sliding elements 2 slide along the circular-cylindrical sliding face 13 on the shaft 1. The sliding elements 2 can, however, also slide along the bearing outer race 3 with their ends 14 which are provided with the spherical outer face, when the shaft 1 rotates, if the sliding elements 2 are prevented from moving relative to the circular-cylindrical sliding face 13. Thus, emergency running of the bearing is made possible. The emergency running properties of the bearing approximately correspond to the running properties of the bearing during normal operation, since, also during emergency running, the sliding elements reduce the friction.

Axial displacements of the shaft 1 are balanced out by sliding of the inner ends 12 of the sliding elements 2 on the shaft 1, and wobbling movements of the shaft 1 are balanced out by sliding of the outer ends 14 of the sliding elements 2 on the spherical inner face 15 of the bearing outer race 3. Because of this, all movements of the shaft, i.e. rotating, axial sliding and wobbling, are accommodated by the sliding elements, thus leading to constant friction conditions for these movements, with equal friction coefficients.

According to FIG. 1 only one bearing race accommodating the load, i.e. the bearing outer race 3, is provided, which race makes a movement relative to the shaft 1 during wobbling of the latter, so that the construction height of the bearing can be kept very low. If the construction height is intended to be kept even lower, it is also possible to design the bearing outer race 3 as the bearing housing.

Figure 2:
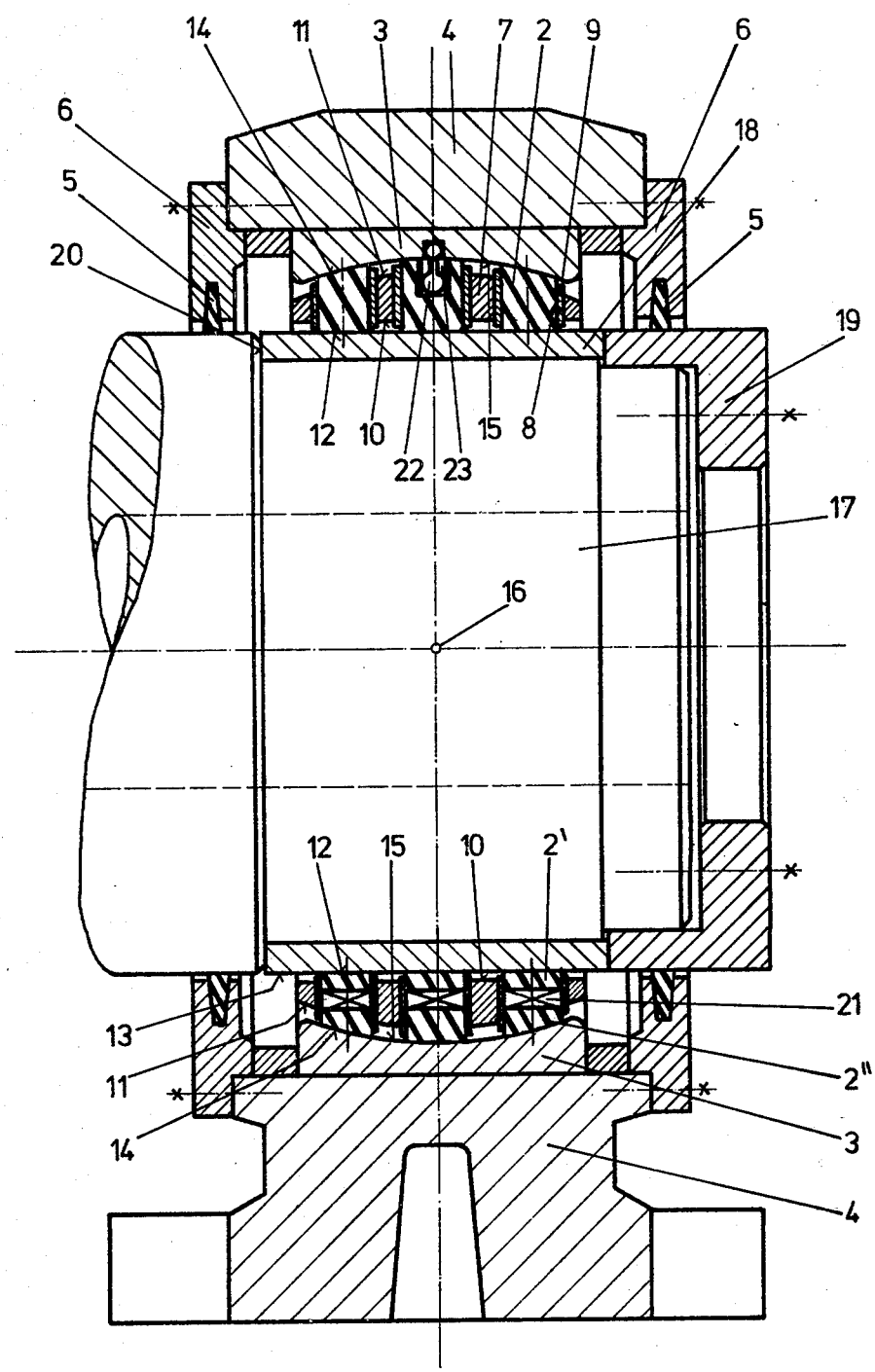

FIG. 2 shows an expansion bearing especially provided for accommodating a converter carrying trunnion 17. This bearing in its basic construction resembles that illustrated in FIG. 1. However, it differs from the bearing shown in FIG. 1 in that a running race 18 is slipped on the carrying trunnion 17. The surface of race 18, which the sliding elements 2 contact, is hardened and ground. The bearing race 18 is braced by an end disc 19 against a shoulder 20 of the carrying trunnion 17 and forms a construction unit with the carrying trunnion. For making a weight determination of the converter or the converter content, respectively, the sliding elements 2 arranged in the load zone of the bearing are divided in the peripheral direction of the bearing. Between parts 2' and 2" of the sliding elements, superimposed on each other in the radial direction, a force measuring device, in particular a load cell 21, is arranged. In order to be able to guide the electrical leads (not illustrated) of the load cells outwards, the cage is secured against rotation by a safety bolt 22 articulately inserted in the bearing outer race 3 and projecting into a recess 23 of one of the sliding elements. The safety bolt could also project into a recess of the cage, with play.

What we claim is:

1. In a slide-articulation bearing arrangement, in particular for tiltable converters, for supporting a shaft therein and being of the type including a circular-cylindrical sliding face forming a unit with said shaft, sliding elements contacting said circular-cylindrical sliding face, a cage holding said sliding elements and having an inner side and an outer side, and an outer race having a spherical inner face for accommodating wobbling movements of said shaft, the improvement which is characterized in that said cage is provided with radially directed recesses open towards said inner side and said outer side of said cage, said sliding elements being inserted in said recesses so as to project out of said recesses and having outwardly projecting ends provided with spherical outer faces, said spherical outer faces of said outwardly projecting ends of said sliding elements contacting and cooperating with the spherical inner face of the outer race.

2. A slide-articulation bearing arrangement as set forth in claim 1, wherein said sliding elements are produced of synthetic material.

3. A slide-articulation bearing arrangement as set forth in claim 1, wherein said radially directed recesses provided in said cage, penetrate said cage and wherein said sliding elements inserted therein are one-piece sliding elements.

4. A slide-articulation bearing arrangement as set forth in claim 1, further comprising a slide bushing surrounding said shaft to form said circular-cylindrical sliding face, said sliding elements having inwardly extending ends contacting said slide bushing.

5. A slide-articulation bearing arrangement as set forth in claim 1, wherein said cage is loosely inserted between said circular-cylindrical sliding face and said outer race so as to enable said cage to follow a rotation of said circular-cylindrical sliding face.

6. A slide-articulation bearing arrangement as set forth in claim 1, wherein, at least where the bearing is under load, said sliding elements are each comprised of two parts superimposed on each other in the radial direction; wherein one of said sliding elements is provided with a recess; and wherein said slide-articulation bearing arrangement further comprises a force-measuring device inserted between said two parts of each sliding element, and a safety bolt inserted in said outer race and projecting into said recess provided in one of said sliding elements so as to secure said cage against rotation.

7. A slide-articulation bearing arrangement as set forth in claim 1, wherein, at least where the bearing is under load, said sliding elements are each comprised of two parts superimposed on each other in the radial direction; wherein said cage is provided with one additional recess; and wherein said slide-articulation bearing arrangement further comprises a force-measuring device inserted between said two parts of each sliding element, and a safety bolt inserted in said outer race and projecting into said one additional recess provided in said cage so as to secure said cage against rotation.

* * * * *